UNITED STATES PATENT OFFICE.

WILLIAM A. CHAPMAN, OF CLEBURNE, TEXAS.

LIQUID FOR EXTERMINATING GRASS OR SIMILAR GROWTHS.

SPECIFICATION forming part of Letters Patent No. 606,644, dated July 5, 1898.

Application filed April 18, 1896. Serial No. 588,168. (No specimens.)

*To all whom it may concern:*

Be it known that I, WILLIAM A. CHAPMAN, a citizen of the United States, residing at Cleburne, in the county of Johnson and State of Texas, have invented a new and useful Liquid for Exterminating Grass or Similar Growths, of which the following is a specification.

This invention relates to compounds for destroying or exterminating grass, foliage, and similar growths, and is especially designed for killing such obnoxious vegetable growths as Johnson and Bermuda grass.

With this object in view the invention consists in the employment of white arsenic or arsenious acid and nitrate of soda to form a mixture or solution having the exterminating qualities referred to, and in the preparation of this solution one pound of white arsenic or arsenious acid is introduced into six gallons of water, and the whole is heated to a boiling temperature until the arsenious acid is well dissolved. The boiled mixture is then set in a cool place until completely cooled, and one pound of pulverized nitrate of soda is then introduced into the mixture and thoroughly dissolved, thus completing the mixture or solution and rendering the same available for immediate use.

The addition of nitrate of soda to the arsenious solution has the effect of preventing crystallization of the white arsenious acid, thus preserving the strength of the solution. Any fertilizing effect of the nitrate of soda on the grass or vegetable growth is counteracted by the presence of the arsenious acid in the solution. The arsenious acid has a specific poisonous action on the grass or vegetable growth, while the nitrate of soda in the presence of the arsenious solution causes deterioration and decay of the growth it is desired to destroy, the liquid penetrating to the roots of the grass and vegetable growth, so as to carry the poisonous elements through the ground and to the roots to kill the plant.

The mixture is applied to the grass or other growth with a spray or sprinkling-pot, and in the event of sprouts appearing after one application of the solution a second application should be given to the growth for the purpose of insuring extermination thereof; but it will be of course understood that the mixture may be applied to different growths in any convenient manner.

Having thus described the invention, what is claimed, and desired to be secured by Letters Patent, is—

The liquid herein described for destroying grass and vegetable growths, consisting of an arsenious solution having nitrate of soda dissolved therein to maintain the solubility of said arsenious acid, as and for the purposes set forth.

In testimony that I claim the foregoing as my own I have hereto affixed my signature in the presence of two witnesses.

WILLIAM A. CHAPMAN.

Witnesses:
E. B. STAURCIPHER,
L. M. LAYTON.